Patented July 1, 1930

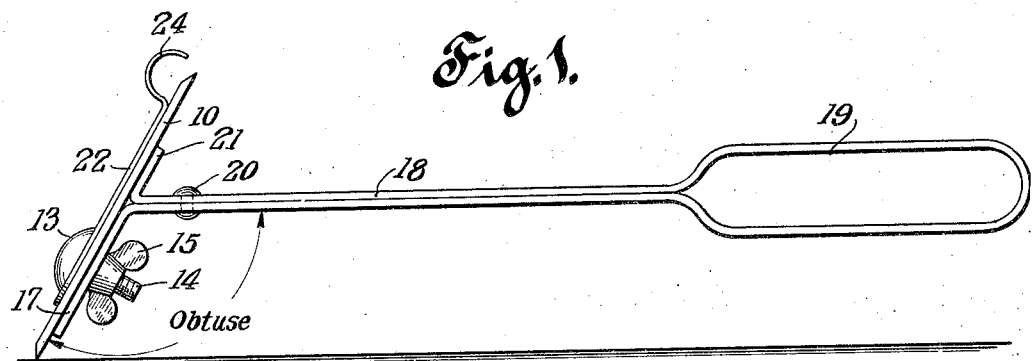

1,768,537

UNITED STATES PATENT OFFICE

SAMUEL ALEXANDER, OF NEW YORK, N. Y.

SCRAPER

Application filed March 28, 1929. Serial No. 350,503.

This invention relates to that class of implements used in smoothing the surfaces of objects by drawing a keen edged blade thereover, such devices being commonly known as scrapers.

The present invention is an improvement over my prior Patent Number 1,696,561, and has as one of its objects to provide a polygonal blade capable of being operated in corners.

A further feature is in the provision of a scraping blade having a central aperture preferably shaped in conformity with the profile of the blade and adapted to receive the correspondingly shaped shank of a bolt by which the handle is secured.

Another purpose is to produce a combined blade guard and hand rest preventing accidental cuts and providing an effective grip in applying pressure and in guiding the tool.

Other objects are in providing a scraper blade the cutting edges of which may be sharpened by a burnisher reducing the necessity of frequent grinding; in the location of a handle relative to the blade whereby a shearing draw cut is obtained and by which a certain amount of flexure of the blade is secured; in the provision of a single bolt to secure the blade, guard and handle firmly together, and in the simplicity of the parts employed.

These advantageous objects are accomplished by the novel construction and combination of parts hereinafter described and illustrated in the accompanying drawing, forming a material part of this disclosure, and in which:—

Figure 1 is a side elevational view of an embodiment of the invention illustrating its application.

Figure 2 is a front elevational view of the same.

Figure 3 is a similar view of the same showing a slight modification.

Figure 4 is an enlarged fragmentary sectional view taken on line 4—4 of Figure 2.

Figure 5 is a front elevational view of a scraper having a quadrangular blade.

Figure 6 is an enlarged transverse sectional view taken on line 6—6 of Figure 5.

Figure 7 is a fragmentary sectional view of the blade edge, drawn to an enlarged scale and showing the effects of a burnishing operation.

The scraping blade 10 may have any regular polygonal profile, as the equilateral triangle shown in Figures 2 and 3, and in which any of the bevelled edges, as $a$, $b$ and $c$ may be brought into operative position.

Centrally of the blade is an opening 11 having a similar number of sides as the profile of the blade to receive a correspondingly shaped shank 12 of a clamp bolt having a head 13 and threaded stem 14 engageable by a wing nut 15.

The polygonal shank 12 also passes through a similarly shaped opening 16 in the central portion of the pad or lower member 17 of a handle bar 18, extending at an obtuse angle of not less than 120 degrees and also turned to the right hand at an acute angle A of 15 degrees.

The bar 18 is bent upon itself to present adjacent layers, continued to a suitable distance outwardly and bent to form a looped handle 19 of sufficient size to receive the fingers of an operator, the upper member of the bar being rigidly united to the lower member by spot welding or a rivet 20 as shown, its extreme end portion 21 being upturned to register with the lower member 17.

A guard 22, generally triangular in profile, is formed with a circular opening 23 in its central lower portion, through which the bolt shank 12 freely passes, the length of the shank being slightly less than the combined thicknesses of the elements 22, 10 and 17, so that they may be securely clamped by the nut 15.

From the foregoing it will be seen that when the scraper blade is drawn rearwardly during operation, the lower element 17 of the handle flexes forwardly and the upper element 21 rearwardly, thereby offering a certain amount of elasticity or flexible resistance, while, when the scraper is moved forwardly the lower end only flexes rearwardly, thereby offering a lesser flexing resistance.

The inverted base portion of the guard plate is formed into an outwardly and upwardly curled hand grip 24, its upper edge being disposed slightly above the uppermost edge of the blade 10 and is so proportioned as to be easily and firmly grasped, affording a convenient means for applying pressure and in guiding the tool, while at the same time it serves to prevent the fingers from coming into contact with the cutting edges of the blade.

In Figure 3 the blade 10 is shown as having perforations 25 adapted to receive a pin 26 rigidly set in the short arm 21 of the handle, the pin acting as an auxiliary to the cross section angles of the bolt shank in locating the handle on the blade.

The modification seen in Figures 5 and 6 merely show the use of a square blade 30 in which is a square central aperture 31 to receive the square shank 32 of a clamp bolt, the nut handle and guard elements being the same as previously described.

It is to be noted that by reason of the obtuse angularity of the handle, relative to the blade, a scraping effect is readily attainable in a convenient manner; also due to the lateral angle of the handle to the blade, a shearing effect is produced, thus enabling an amateur or inexperienced person to obtain superior results.

It is found in practice that on account of the specially acute angle of the cutting edges, which may be acutely sharp or rounded at their corners, an effectively keen shearing and scraping bite effect may be produced by passing a smooth hard burnisher over them, such pressure being applied as may be required, so that a wire edge is imparted, as shown in Figure 7, this manner of sharpening being a much quicker process than by regrinding, the operation of which is less frequently required than is usual.

The foregoing taken into consideration with the ease of releasing the clamp nut and turning a fresh sharp cutting edge into position, renders the tool particularly convenient and effective for long continued service.

While certain preferred embodiments of this device have been shown and described, it will be understood that changes in the form, arrangements, proportions, sizes and details thereof may be made without departing from the scope of the invention as defined in the appended claim.

Having thus described the invention, what is claimed as new and desired to secure by Letters Patent, is:

A scraper comprising a handle consisting of a bar bent upon itself to present adjacent bottom and top layers, means for rigidly connecting said layers, the free end of said bottom layer being bent downwardly at an inclination, the free end of the top layer being bent upwardly at an inclination and in the same plane as said free end of the bottom layer, a scraper blade flat against both of said ends, and means for rigidly attaching said scraper blade onto the free end of said bottom layers so that when the scraper is drawn rearwardly in operation said bottom end flexes forwardly and said top end rearwardly for offering a certain amount of flexing resistance, and when the scraper is moved forwardly only said bottom end flexes rearwardly for offering a smaller amount of flexing resistance to that above mentioned.

In testimony whereof I affix my signature.

SAMUEL ALEXANDER.